US012762274B2

(12) United States Patent
Sarkisian et al.

(10) Patent No.: US 12,762,274 B2
(45) Date of Patent: Oct. 13, 2026

(54) INFORMATION PROCESSING DEVICE, INFORMATION PROCESSING SYSTEM, AND INFORMATION PROCESSING METHOD

(71) Applicant: HONDA MOTOR CO., LTD., Tokyo (JP)

(72) Inventors: Alan Robert Sarkisian, Wako (JP); Manuel Dietrich, Offenbach/Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

(21) Appl. No.: 18/783,700

(22) Filed: Jul. 25, 2024

(65) Prior Publication Data

US 2025/0111080 A1 Apr. 3, 2025

(30) Foreign Application Priority Data

Sep. 29, 2023 (JP) ................................ 2023-168996

(51) Int. Cl.
*G06F 21/00* (2013.01)
*G06F 21/62* (2013.01)

(52) U.S. Cl.
CPC .. *G06F 21/6245* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 11,010,492 | B1 | 5/2021 | Kayyoor et al. | |
| 11,138,974 | B2 * | 10/2021 | Wang | G06F 21/6245 |
| 11,195,534 | B1 * | 12/2021 | Shen | G10L 17/00 |
| 11,436,380 | B2 * | 9/2022 | Lawrenson | G06F 21/6245 |
| 11,997,059 | B1 * | 5/2024 | Su | H04L 51/063 |
| 12,005,579 | B2 * | 6/2024 | Kim | G06N 7/01 |
| 12,299,180 | B1 * | 5/2025 | Guerra | G06F 21/62 |

(Continued)

FOREIGN PATENT DOCUMENTS

| | | |
|---|---|---|
| JP | 2013-070971 | 4/2013 |
| WO | 2022/102891 | 5/2022 |

OTHER PUBLICATIONS

Extended European Search Report for European Patent Application No. 24192831.6 dated Jan. 3, 2025.

(Continued)

*Primary Examiner* — Shin-Hon (Eric) Chen
(74) *Attorney, Agent, or Firm* — Amin, Turocy & Watson, LLP

(57) ABSTRACT

An information processing device for processing user information about a user includes at least one of a first information area and a second information area for classifying the user information. The first information area is a general access permission determination block having a list including a sensitive topic, sensitivity scores assigned to topics including the sensitive topic, and an appropriate data processing level allowed for the information processing device of the user information. The second information area is a user-specific access permission block when information is exchanged between the information processing device and another user different from the user or an information processing device of the other user.

6 Claims, 10 Drawing Sheets

(56) References Cited

U.S. PATENT DOCUMENTS

| | | | | |
|---|---|---|---|---|
| 2019/0253269 | A1* | 8/2019 | Keane | H04L 63/0254 |
| 2019/0253431 | A1 | 8/2019 | Atanda | |
| 2019/0273702 | A1* | 9/2019 | Zweig | H04L 51/02 |
| 2019/0366557 | A1* | 12/2019 | Gewickey | G06N 3/008 |
| 2021/0192651 | A1* | 6/2021 | Groth | G06N 3/09 |
| 2022/0036708 | A1* | 2/2022 | Rey | G06F 21/84 |
| 2022/0383896 | A1* | 12/2022 | Hajiyev | G10L 25/72 |
| 2023/0223026 | A1* | 7/2023 | Grichnik | H04L 51/216 704/235 |
| 2023/0359911 | A1* | 11/2023 | Kapoor | G06F 40/30 |
| 2024/0103677 | A1* | 3/2024 | Mckenzie | G06F 3/011 |
| 2025/0068662 | A1* | 2/2025 | Choi | G06F 16/334 |
| 2025/0094619 | A1* | 3/2025 | Pasumarthi | G06F 21/6227 |

OTHER PUBLICATIONS

Tang, et al. "Confidant: A Privacy Controller for Social Robots", arxiv.org, Cornell University Library, 201 Olinlibrary Cornell University Ithaca, NY 14853, Jan. 8, 2022.

Japanese Office Action for Japanese Patent Application No. 2023-168996 mailed Jun. 9, 2026.

Takashi Fujii et al., Personalized Information Service System Applied to Access from Various Information Terminals, Proceedings of the 68th (2006) National Convention of the Information Processing Society of Japan (3), Japan, Information Processing Society of Japan, Mar. 7, 2006, 2R-8, pp. 608-604.

* cited by examiner

| USER ID | PRIVACY POLICY | | | | IMAGE INFORMATION | SOUND INFORMATION |
|---|---|---|---|---|---|---|
| | SHARING | HOLDING | LEARNING | ... | | |
| IDXXX1 | ALLOWED | ALLOWED | ALLOWED | ... | | |
| IDXXX2 | ALLOWED | DISALLOWED | DISALLOWED | ... | | |
| ... | ... | ... | ... | ... | | |
| IDXXXn | | | | | | |
| ... | | | | | | |

INFORMATION PROCESSING DEVICE, INFORMATION PROCESSING SYSTEM, AND INFORMATION PROCESSING METHOD

CROSS-REFERENCE TO RELATED APPLICATION

Priority is claimed on Japanese Patent Application No. 2023-168996, filed Sep. 29, 2023, the content of which is incorporated herein by reference.

BACKGROUND OF THE INVENTION

Field of the Invention

The present invention relates to an information processing device, an information processing system, and an information processing method.

Description of Related Art

In recent years, the development of social robots that communicate with users or perform a support process and the like has been underway. These social robots use user information about users to identify the users. Examples of the user information include face images, names, genders, ages, information indicating where the users live, conversations conducted by the social robots, and the like. In general, the user performs a setting process for handling personal information with respect to the social robot used by the user to use the social robot. For this reason, as indicated by reference sign g900 of FIG. 11, each user (g902 or g904) causes a trusted individual robot (g901 or g903) to process user data. FIG. 11 is a diagram showing an example in which an individual has a robot device that processes his or her data in the prior art. In this example, a first robot g901 is owned by a first user g902 and a second robot g903 is owned by a second user g904.

In recent years, social robots have been used in public places, companies, private homes, and the like. In this case, for example, Mr. A is concerned about the handling of personal information of Mr. A when interacting with a social robot owned by Mr. B. For example, as indicated by reference sign 910 of FIG. 11, in the case of interaction between groups, the user may not trust a robot owned by another person that processes or disposes of his or her data. In the example of reference sign g910, a first user g912, who is an owner of a first robot g911, is in front of a second robot g913 owned by a second owner g914.

On the other hand, a process of switching a mode to a privacy mode of a device on the basis of a keyword uttered by an individual and voice recognition has been proposed (see, for example, Patent Document 1 below).

[Patent Document 1] U.S. Pat. No. 11,138,974

SUMMARY OF THE INVENTION

However, the problem with the prior art is that a social robot that is not owned by the user cannot be trusted to the same extent as a social robot that is owned by the user.

An aspect according to the present invention has been made in view of the above problems and an objective of the present invention is to provide an information processing device, an information processing system, and an information processing method for enabling a social robot to appropriately handle user information.

To achieve the objective by solving the above problems, the present invention adopts the following aspects.

(1) According to an aspect of the present invention, there is provided an information processing device for processing user information about a user, the information processing device including: at least one of a first information area and a second information area for classifying the user information, wherein the first information area is a general access permission determination block having a list including a sensitive topic, sensitivity scores assigned to topics including the sensitive topic, and an appropriate data processing level allowed for the information processing device of the user information, and wherein the second information area is a user-specific access permission block when information is exchanged between the information processing device and another user different from the user or an information processing device of the other user.

(2) In the above-described aspect (1), the information processing device may further include a third information area for classifying the user information that is registered information of a publicly accessible user and information processing device.

(3) In the above-described aspect (2), an information area may be classified as any one of the first information area, the second information area, and the third information area on the basis of a level of trust between the user and the other user who exchanges information with the user.

(4) In any one of the above-described aspects (1) to (3), a procedure for acquiring other user information about the other user and applying the acquired other user information to processing and understanding by the information processing device on the basis of either one of the first information area and the second information area may be identified.

(5) In any one of the above-described aspects (1) to (4), other user information about the other user may be acquired and the other user information may be sent to the information processing device of the other user after the other user information is encrypted when processing by the information processing device of the user is not allowed on the basis of the second information area for processing of the acquired other user information and when transmission to the information processing device of the other user is allowed. Also, other user information about the other user may be acquired, the other user information may be deleted when processing by the information processing device of the user is not allowed on the basis of the second information area for processing of the acquired other user information and when transmission to the information processing device of the other user is not allowed, and the other user information may not be sent to the information processing device of the other user.

(6) In any one of the above-described aspects (1) to (5), other user information about the other user may be acquired and it may be determined whether to perform processing of all of the other user information or whether to perform processing of a part of the other user information on the basis of a processing level when processing by the information processing device of the user is allowed on the basis of the second information area for processing of the acquired other user information.

(7) According to an aspect of the present invention, there is provided an information processing system including: a first information processing device of a first user; and a second information processing device of a second user, wherein the second information processing device includes at least one of a first information area and a second information area for classifying user information, and classifies an information area as either one of the first information area and the second information area on the basis of a level of trust between the second user and the first user who exchanges information with the second user, wherein the first information area is a general access permission determination block having a list including a sensitive topic, sensitivity scores assigned to topics including the sensitive topic, and an appropriate data processing level allowed for the information processing device of the user information, wherein the second information area is a user-specific access permission block when information is exchanged between the first user or the first information processing device and the second information processing device, and wherein information is exchanged between the first information processing device and the second information processing device when the exchange of the information between the first information processing device and the second information processing device has been allowed.

(8) According to an aspect of the present invention, there is provided an information processing method of an information processing device for processing user information about a user, the information processing method including: at least one of a first information area and a second information area for classifying the user information, wherein the first information area is a general access permission determination block having a list including a sensitive topic, sensitivity scores assigned to topics including the sensitive topic, and an appropriate data processing level allowed for the information processing device of the user information, wherein the second information area is a user-specific access permission block when information is exchanged between the information processing device and another user different from the user or an information processing device of the other user, and wherein a procedure for acquiring other user information about the other user and applying the acquired other user information to processing and understanding by the information processing device on the basis of either one of the first information area and the second information area is identified.

According to the above-described aspects (1) to (8), a social robot can appropriately handle user information.

According to the above-described aspects (1) to (8), the robot can recognize an allowed level of appropriate processing that is performed by itself and what to do (or what not to do) with respect to personal user data.

According to above-described aspects (1) to (8), appropriate-level-based processing allowed to be performed can be performed in accordance with a user's personal preferences regarding how the user's data should be handled and processed by other devices.

DETAILED DESCRIPTION OF THE INVENTION

Figure 1:
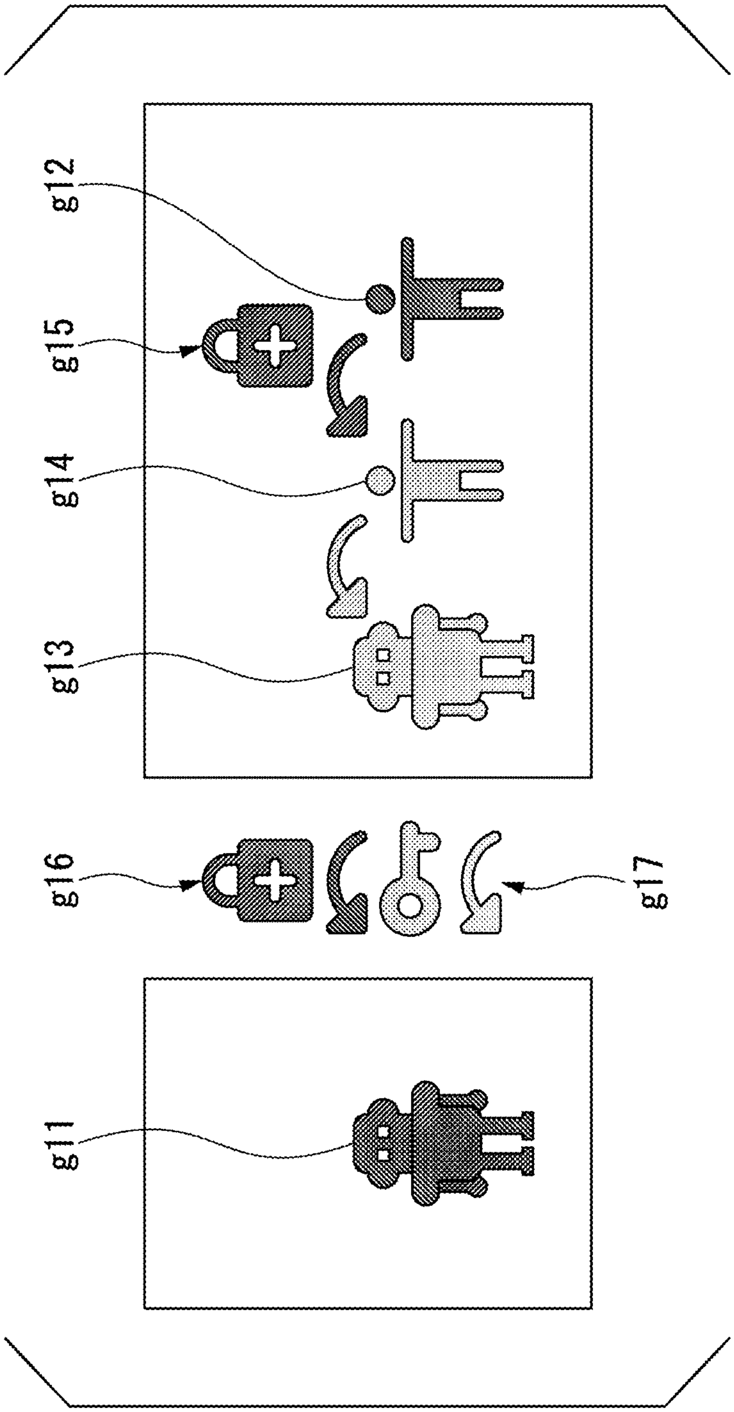
FIG. 1 is an explanatory diagram of an overview of handling and processing of personal information in an embodiment.

Hereinafter, embodiments of the present invention will be described with reference to the drawings. Also, in the drawings used for the following description, the scales of respective members may have been appropriately changed to make each member have a recognizable size.

In all the drawings for describing the embodiments, components having the same function are denoted by the same reference signs and redundant descriptions thereof will be omitted.

In the present application, the term "based on XX" indicates "based on at least XX" and includes cases based on another element in addition to "XX." In addition, the term "based on XX" is not limited to cases in which "XX" is directly used, and also includes cases based on "XX" on which calculation or processing has been performed. "XX" may be any element (for example, any information).

<Overview>

First, an overview of handling and processing of personal information in the present embodiment will be described. In the following description, a "social robot" is referred to as a "robot."

FIG. 1 is a diagram showing the overview of handling and processing of personal information in the present embodiment. In the example of FIG. 1, a first robot g11 is owned by a first user g12 and a second robot g13 is owned by a second user g14 in this example. Also, the first user g12 is in front of the second robot g13.

In this case, as indicated by reference signs g15 and g16, the first user g12 may want to use the second robot g13 as a pass-through or limited processing device through which data is allowed to only pass and may want to handle data so that the data is processed by a robot capable of being trusted by the first user g12.

According to this processing, because the first user g12 can process his or her data or send the data back to his or her first robot g11, the second robot g13 of the second user g14 can be partially and appropriately trusted.

Figure 2:
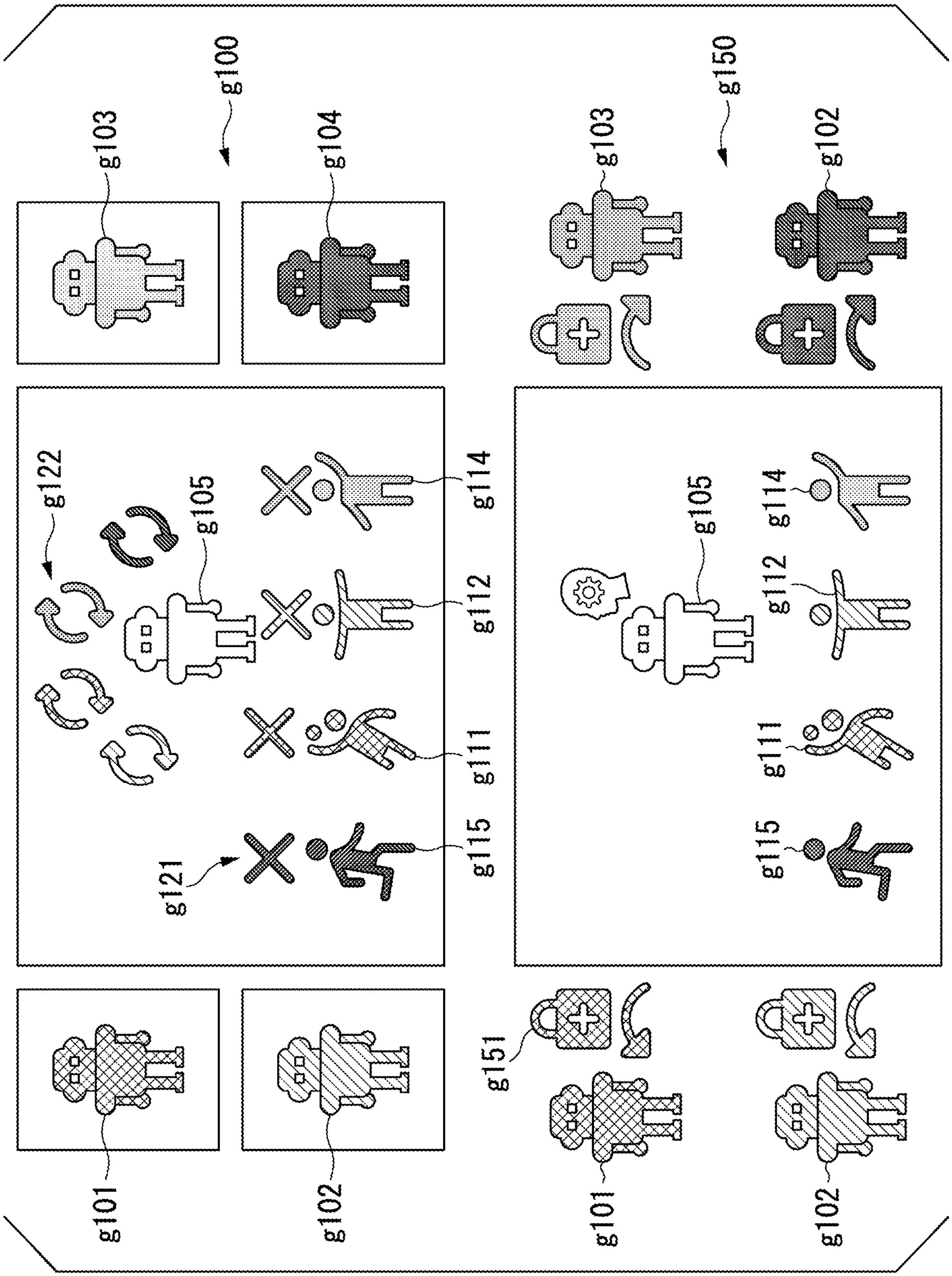
FIG. 2 is an explanatory diagram of handling of personal information for an unknown robot.

FIG. 2 is an explanatory diagram of the handling of personal information for an unknown robot. In FIG. 2, a first robot g101 is owned by a first user g111, a second robot g102 is owned by a second user g112, a third robot g103 is owned by a third user g113, and a fourth robot g104 is owned by a fourth user g114. A fifth robot g105 is, for example, a robot placed in a public place, a shop, or the like, but is an unknown robot for the first to fourth users g111 to g114.

In such a situation, the users do not want to allow the fifth robot g105 to process or possess their personal information, as indicated by reference sign g121, because they cannot trust the unknown robot. For this reason, the users do not want to allow data exchange between the fifth robot g105 and their first to fourth robots g101 to g104.

For this reason, the users may desire that the fifth robot g105 should function to safely send data to their robots, as indicated by reference sign g150 of FIG. 2.

For this reason, the robot of the present embodiment identifies an individual present in a given place during the interaction and acquires a privacy profile associated with the identified individual. The privacy profile includes, for example, information about the user's preferences regarding how the user's interaction data should be used, processed, and referred to and the user should be notified of a behavioral response of the robot. The privacy profile includes information about whether or not to allow the sharing, holding, and learning of results. For example, in the privacy profile, for example, a user selects allowance or disallowance of whether or not the robot can use the data handled by the robot and the like. The privacy profile may be acquired by the robot, for example, in bulk, may be acquired in the interaction with the user, or may be set by the user manipulating a touch panel or the like.

Also, the robot performs appropriate-level-based processing allowed to be performed in accordance with the user's personal preferences regarding how the user's data should be handled and processed by the other robot on the basis of this privacy profile. The robot does not perform any processing that is not allowed. In the present embodiment, as a prerequisite, the user trusts that his or her robot performs the processing and determines whether or not the processing is appropriate for other robots to perform the processing. A level, processing, and the like will be described below.

<Personal Privacy Profile>

First, the handling of the privacy profile of the present embodiment, policy, and the like will be described.

Figure 3:
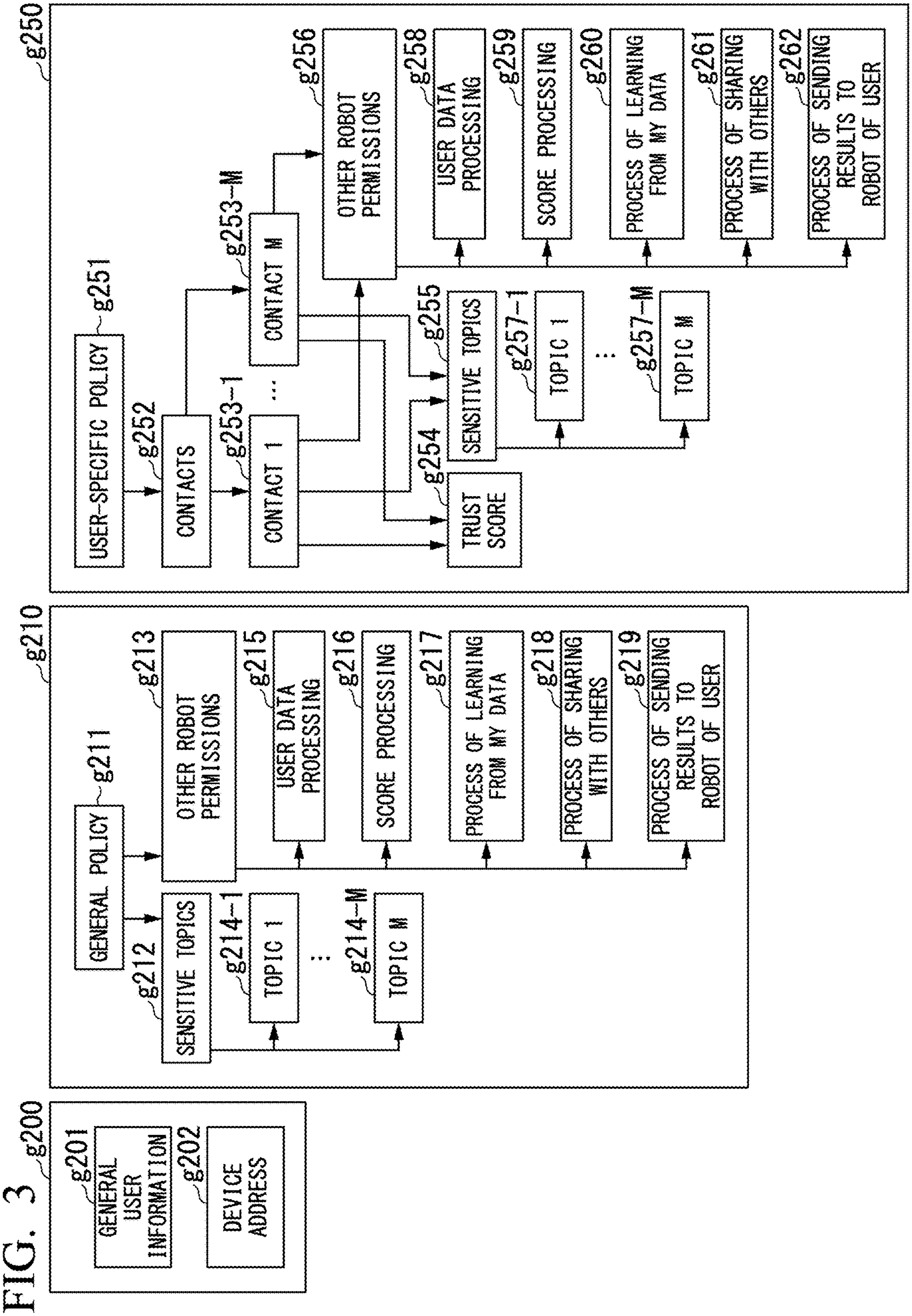
FIG. 3 shows an example of a user's public privacy policy.

FIG. 3 is a diagram showing an example of a user privacy policy (user public privacy policy).

In a square (third information area) of reference sign g200, for example, general user information g201 (public accessible user information) and a device address g202 are provided.

The information in this area is information about an individual considered appropriate to be shared with other robots. This information includes, for example, information about the user (general user information) such as a name of the user and a user ID (identification information) within a robot system. This information also includes, for example, a device address that can be used by other robots to potentially send data.

A square (first information area) of reference sign g210 includes, for example, a general policy g211, sensitive topics g212, and other robot permissions g213 (other device permissions).

The sensitive topics g212 include M topics (where M is an integer of 2 or more) from topic 1 (g214-1) to topic M (g214-M). Each topic includes an estimated sensitivity score (Sensitivity Est. Score).

A block of the other robot permissions (g213) is a generalized permission block that is considered to be the default policy regarding how other robots use this personal data. This block includes a series of permission policies that decide a level of data processing capable of being performed by other robots for the user.

The other robot permissions (g213) include, for example, the following content.

a) User data processing (Can Process my data) (g215); whether or not another robot (second robot) can process this user information (Yes or No).

b) Score processing (Can Store) (g126): whether or not another robot (second robot) can store user information within the memory of the second robot (Yes or No).

c) Process of learning from my data (Can Learn from my data (anon)) (g217): whether another device (second robot) can learn from this user information (unrestrictedly possible, anonymously possible, or not possible).

d) Process of sharing with others (Can Share with others) (g218): whether or not another robot (second robot) can share this user information with the user's first robot (Yes or No).

e) Process of sending results to the robot of the user (Can send results to my device) (g219); whether another robot (second robot) can send this user information back to the user's first robot (send all of the results and raw data, send only the results after processing, send only the raw data before processing, or send nothing).

The policy, processing, and determination described above are examples and the present invention is not limited thereto.

The purpose of sensitive topics (g212) is, for example, to provide a notification of sensitivity when a specific topic is discussed by another robot (a second robot). This policy includes, for example, whether or not it is an appropriate topic to discuss medical information such as allergies and the like.

The score for each topic provides granularity in deciding permission to discuss the topic.

In the square of reference sign g250 (second information area), a user-specific policy g215, contacts g252, M contacts from contact 1 (g253-1) to contact M (g253-M), a trust score g254, sensitive topics g255, and other robot permissions (other device permissions) g256 are provided.

The trust score g254 is a group trust score and a handling level for user information is changed on the basis of this group trust score. The handling level for the user information is, for example, whether to allow or disallow other robots to share user information, whether to allow or disallow other robots to store user information, or whether to allow or disallow other robots to learn user information. The handling level is not limited to this.

The sensitive topics g255 include M topics (where M is an integer of 2 or more) from topic 1 (g257-1) to topic M (g257-M). Each topic includes an estimated sensitivity score (Sensitivity Est. Score).

Examples of configurations and processing of the other robot permissions g256 will be described below.

Thus, the present embodiment can include a user-specific policy for customizing preferences when the user interacts with other specific individuals or their devices.

As indicated by reference sign g250, there is a permission block designated on the basis of Contact indicating a contact destination identified by the user. Under this permission block, there is a possibility that a permission block will be present when the user interacts with a robot belonging to one of contacts designated by this user.

Furthermore, in addition to the permission block and the sensitive topic block, as indicated by reference sign g250, the user can provide some additional information about his or her contact, such as a trust score and other metadata. The structures, processing, and determinations of the other robot permissions (g256) are similar to those of the other robot permissions (g213).

In the structure of the privacy profile of the present embodiment, flexibility and extensibility are enabled so that entries can be added, modified, and deleted with the elapse of time in accordance with personal preferences and continuous interaction with the robot.

<Default Privacy Profile and Dummy Privacy Profile>

Next, a default privacy profile and a dummy privacy profile will be described.

First, when the user sets up the robot, a “default privacy profile” including, for example, the user’s name, user ID, and device ID in the user information block, is created. Within the general permission block, all individual policies are set to “NO” (not allowed) until the robot learns the user’s preferences for each policy.

Likewise, the sensitive topic block is also left empty until the robot learns the user’s specific topic and how to assess the sensitivity of the topic. Also, the robot leaves a specific permission block empty until the user designates trusted contact.

The concept of a default privacy profile is further abstracted and there is also the idea of a “dummy privacy profile” that can be used to represent a stranger to a robotic system. In the present embodiment, the concept of the “dummy privacy profile” is also used.

The purpose of this “dummy privacy profile” is to represent how robots should handle and process user data of an individual that is unknown to robots and robot systems. The content of the “dummy privacy profile” is the same as that of the default privacy profile, with the exception that there is no device ID associated with this individual (a username field is also left blank). Thus, the unique content of the “dummy privacy profile” is a general authority block in which a uniquely generated user ID and all individual policies are set to “NO.”

Thus, in the present embodiment, an unregistered user does not have a detailed privacy profile like a registered user.

<Example of Configuration of Information Processing System>

Figure 4:
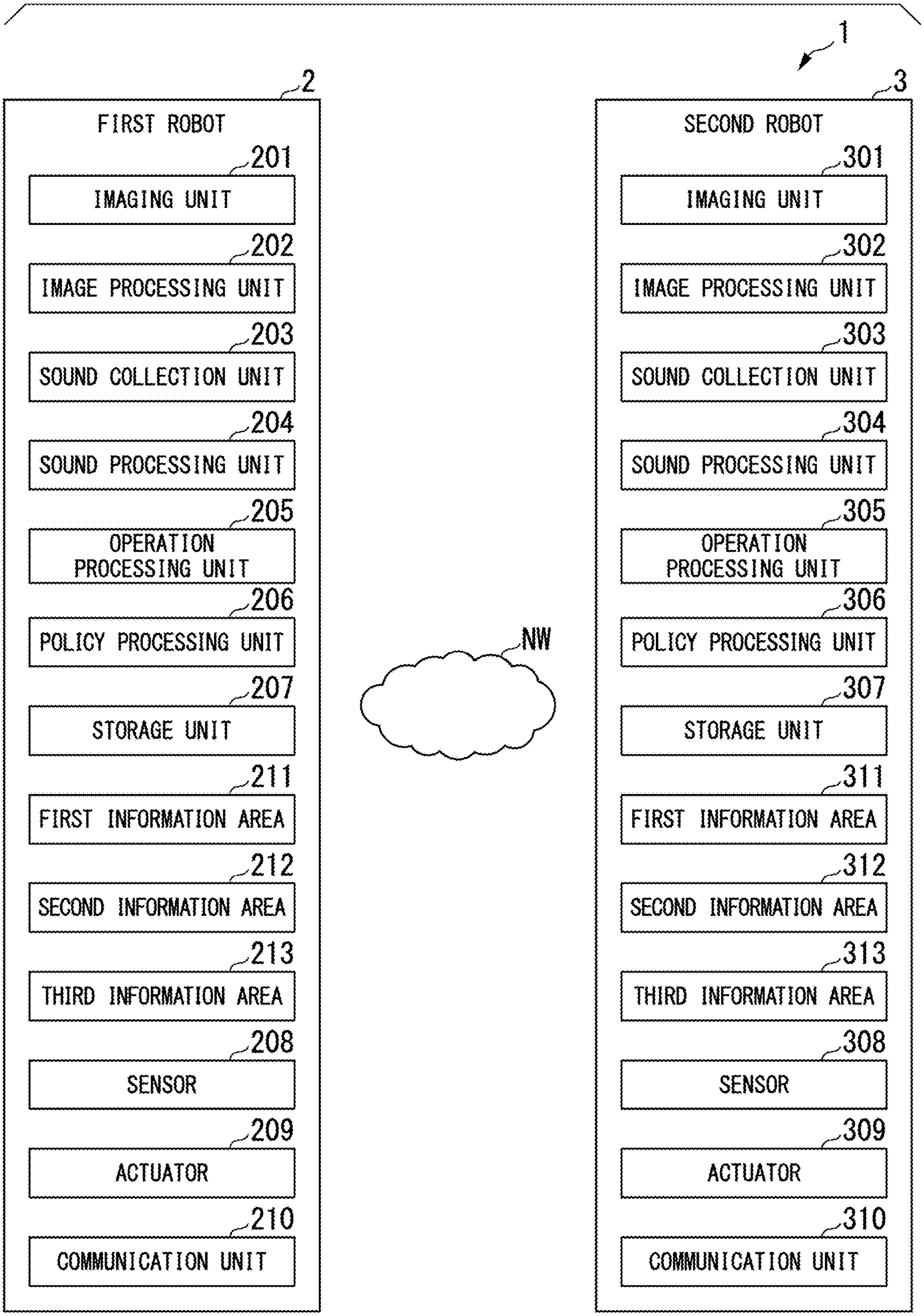
FIG. 4 is a diagram showing an example of a configuration of an information processing system according to the embodiment.

Next, an example of a configuration of the information processing system 1 will be described. FIG. 4 is a diagram showing an example of a configuration of the information processing system according to the present embodiment.

The information processing system 1 includes, for example, a first robot 2 (information processing device) and a second robot 3 (information processing device).

The first robot 2 includes, for example, an imaging unit 201, an image processing unit 202, a sound collection unit 203, a sound processing unit 204, an operation processing unit 205, a policy processing unit 206, a storage unit 207, a sensor 208, an actuator 209, a communication unit 210, a first information area 211, a second information area 212, and a third information area 213.

The second robot 3 includes, for example, an imaging unit 301, an image processing unit 302, a sound collection unit 303, a sound processing unit 304, an operation processing unit 305, a policy processing unit 306, a storage unit 307, a sensor 308, an actuator 309, a communication unit 310, a first information area 311, a second information area 312, and a third information area 313.

The first robot 2 and the second robot 3 are connected wirelessly or over a preferred network NW.

Although two examples of robots are shown in FIG. 4, the number of robots may be two or more. Although not shown, each robot also includes a power-supply circuit or battery, gears connected to the actuators 209 and 309, and the like. The configurations of the first robot 2 and the second robot 3 may be the same or different. In the following description, each part of the second robot 3 as a representative will be described.

The imaging unit 301 is, for example, an imaging device such as a charge-coupled device (CCD) imaging device or a complementary metal oxide semiconductor (CMOS) imaging device attached to the head of the second robot 3 or the like. The imaging unit 301 may be installed in an environment where a robot or a user is present.

The image processing unit 302 extracts, for example, an image of a person’s face included in an image captured by the imaging unit 301, in a well-known method, and performs face recognition on the extracted face image in a well-known method.

The sound collection unit 303 is a microphone and collects the user’s sound signal. The sound collection unit 303 may be a microphone array including a plurality of microphones.

The sound processing unit 304 performs a sound recognition process (for example, a feature quantity extraction process, a noise suppression process, a speech segment estimation process, a sound source direction estimation process, a sound source estimation process, or the like) for the sound signal collected by the sound collection unit 303 in a well-known method.

The operation processing unit 305 controls an operation of the robot in response to a program stored in the storage unit 307 and, for example, a user’s voice instruction, or the like.

The policy processing unit 306 performs a process related to the policy using information subjected to image processing and information subjected to the sound recognition process. A process to be performed by the policy processing unit 306 will be described below.

The storage unit 307 stores programs, threshold values, mathematical formulas, and the like for use in various types of control of the robot. The storage unit 307 stores the user’s sensitive topics list. For example, for each topic or keyword, the user’s sensitive topics list is associated with information indicating allowance or disallowance of a process of the second robot 3. The storage unit 307 stores the user’s specific profile for each user. The user’s unique profile is associated with, for example, whether or not to allow the processing of data to be processed in the second robot 3. The storage unit 307 stores the user’s personal information described above in accordance with the control of the policy processing unit 306. The storage unit 307 stores user information of a person recognized by the policy processing unit 306 on the basis of the policy. Allowance or disallowance is indicated or selected, for example, by the user’s speech. When the second robot 3 includes, for example, an image presentation unit, the second robot 3 may be configured to display a setting screen on the image display unit and set allowance or disallowance in accordance with a detection result of a touch panel sensor provided on the image display unit.

The storage unit 307 includes the following three information areas (the first information area 311, the second information area 312, and the third information area 313).

The first information area 311 corresponds to the inside of the square of reference sign g210 in FIG. 3. The first information area 311 is an area having a list including sensitivity scorings assigned to topics of a sensitive topic and a privacy topic, and an appropriate data processing level acceptable to the information processing device of the user information. The first information area 311 is a general access permission determination block.

The second information area 312 corresponds to the inside of the square of reference sign g250 in FIG. 3. The second information area 312 is a user-specific access permission block for further narrowing down permission blocks when the exchange of information with the first user who is another user different from the second user or the first robot 2 of the first user is performed.

The third information area 313 corresponds to the inside of the square of reference sign g200 in FIG. 3. The third information area 313 is an area for holding registration information of a generally accessible (or available) user and robot.

The first information area 311, the second information area 312, and the third information area 313 classify user information and determine whether to allow or disallow processing on the basis of a classification result.

The first information area 311, the second information area 312, and the third information area 313 include, for example, a policy processing unit 306 and a storage unit 307. The storage unit 307 stores, for example, each policy or device address and the like. The policy processing unit 306 performs a determination process and the like.

Likewise, the first information area 211, the second information area 212, and the third information area 213 include, for example, a policy processing unit 206 and a storage unit 207. Likewise, the storage unit 207 stores, for example, each policy or device address and the like. The policy processing unit 206 performs a determination process and the like.

The sensor 308 is a sensor, an encoder, or the like attached to each part of the robot.

The actuator 209 drives each part of the robot in accordance with the control of the operation processing unit 205.

The communication unit 310 transmits and receives information to and from, for example, other robots.

<Example of Information Stored in Storage Unit>

Figures 5, 6:
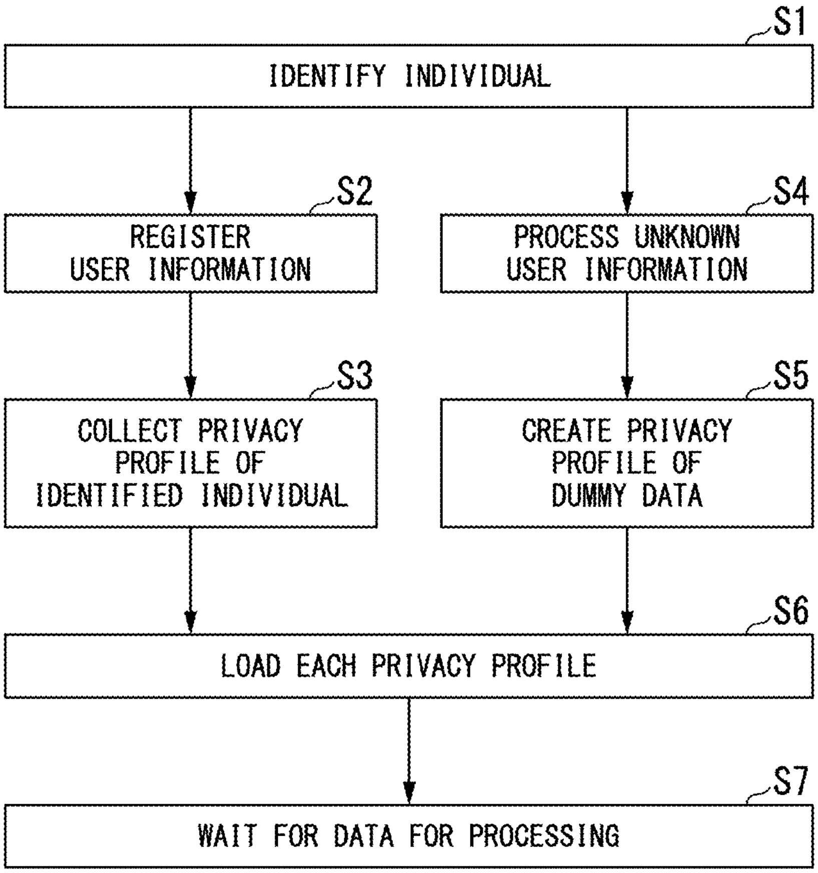
FIG. 5 is a diagram showing an example of a procedure for acquiring a privacy policy according to the embodiment.
FIG. 6 is a diagram showing an example of a user ID and a privacy policy stored in a storage unit.

FIG. 5 is a diagram showing an example of a user ID and a privacy policy stored in the storage unit. As shown in FIG. 5, the storage units 207 and 307 store privacy policy information in association with the user's identification information (user ID). The privacy policy information includes, for example, information such as whether to allow or disallow sharing, whether to allow or disallow holding, and whether to allow or disallow learning. For example, image information (a face image, a feature quantity of an image, or the like) and sound information (a sound feature quantity or the like) may be associated with the user ID.

The policy processing units 206 and 306 perform a process related to policy acquisition as follows with reference to such information stored in the storage units 207 and 307.

<Policy Processing>

Next, a process to be performed by the policy processing unit will be described. FIG. 6 is a diagram showing an example of a procedure for acquiring a privacy policy according to the present embodiment. The following process is performed, for example, when the second robot 3 starts the interaction with the user.

(Step S1) The policy processing unit 306 identifies a person in a given place on the basis of, for example, an image captured by the imaging unit 301 and/or a sound collected by the sound collection unit 303. When there are a plurality of people in the given place, the policy processing unit 306 recognizes each person.

(Step S2) The policy processing unit 306 identifies a recognized person when the person is already recognized and stored in the storage unit 307. Identification information of the person may be stored in a server or the like via the network NW.

(Step S3) The policy processing unit 306 allows the collection and storage of a privacy profile, which is recognized personal user information, and causes the storage unit 307 to store the collected personal information in association with identification information. User information includes, for example, a name, a date of birth, a gender, age, a place of residence, hobbies, speech content, and the like. After the end of step S3, the policy processing unit 306 proceeds to the processing of step S6.

(Step S4) The policy processing unit 306 determines that the person is unknown to a robot when the person is not already recognized and stored in the storage unit 307 or when the individual cannot be identified.

(Step S5) The policy processing unit 306 creates the dummy privacy profile described above. After the end of step S5, the policy processing unit 306 proceeds to the processing of step S6.

(Step S6) The policy processing unit 306 loads the privacy profile of step S3 or S5.

(Step S7) The policy processing unit 306 waits for data for processing.

According to the above-described process, the robot can recognize an allowable level of appropriate processing to be performed by itself and what to do (or what not to do) with personal user data.

<Data Processing Method and Data Processing Procedure>

Figure 7:
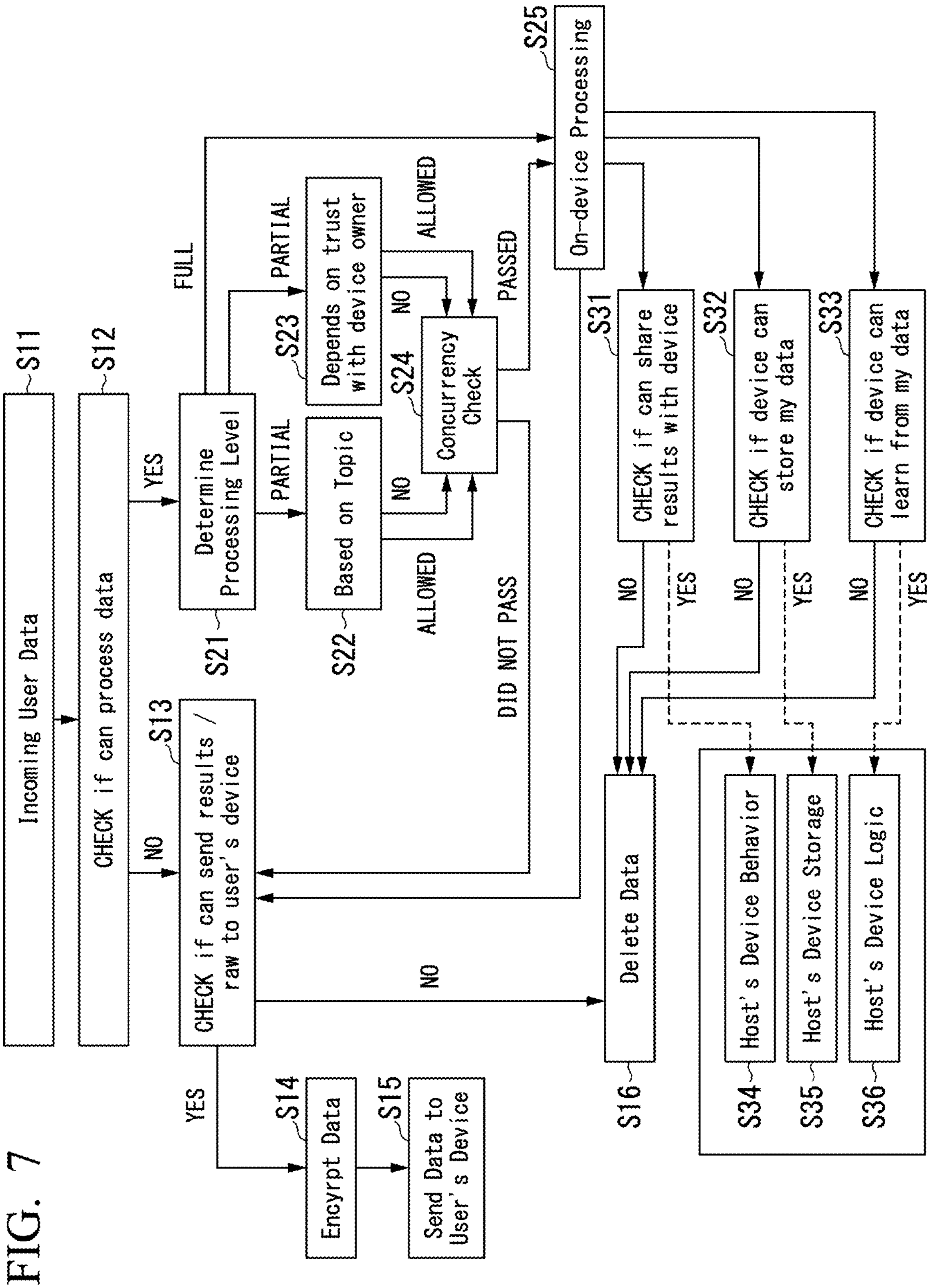
FIG. 7 is a diagram showing an overall image of an example of a data processing method and an example of a data processing procedure in the embodiment.

Next, an example of a data processing method and an example of a data processing procedure will be described. FIG. 7 is a diagram showing an overall image of the example of the data processing method and the example of the data processing procedure in the present embodiment.

As shown in FIG. 7, in the workflow for interaction data for each user, "appropriate processing" to be executed by the second robot 3 and information to be sent to the user's first robot 2 are described. Also, there are, for example, up to five checks that are likely to be executed for user information. This corresponds to the device authority of the user's privacy profile. Processes will be described with reference to FIGS. 8 to 10. In the following description, it is assumed that the robot for performing determination and processing is the second robot 3 and the robot (Host's Device) for exchanging information is the first robot 2.

(First Process)

Figure 8:
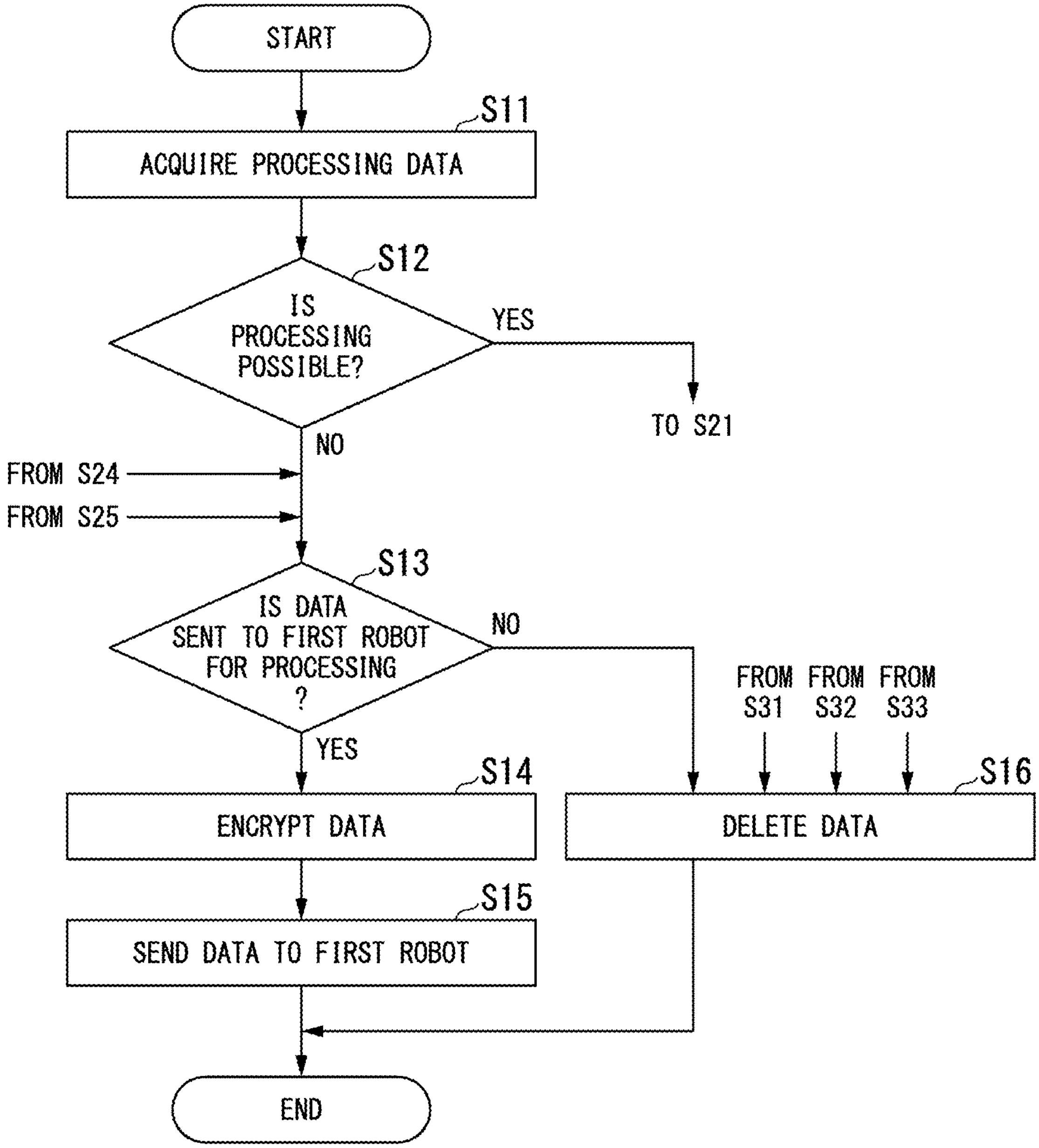
FIG. 8 is a flowchart of a first process in the embodiment.

FIG. 8 is a flowchart of a first process in the present embodiment. The first process is a process when the data processing check fails.

(Step S11) The policy processing unit 306 acquires processing data. The processing data is, for example, information based on a captured user image and speech content of a collected sound.

Figure 9:
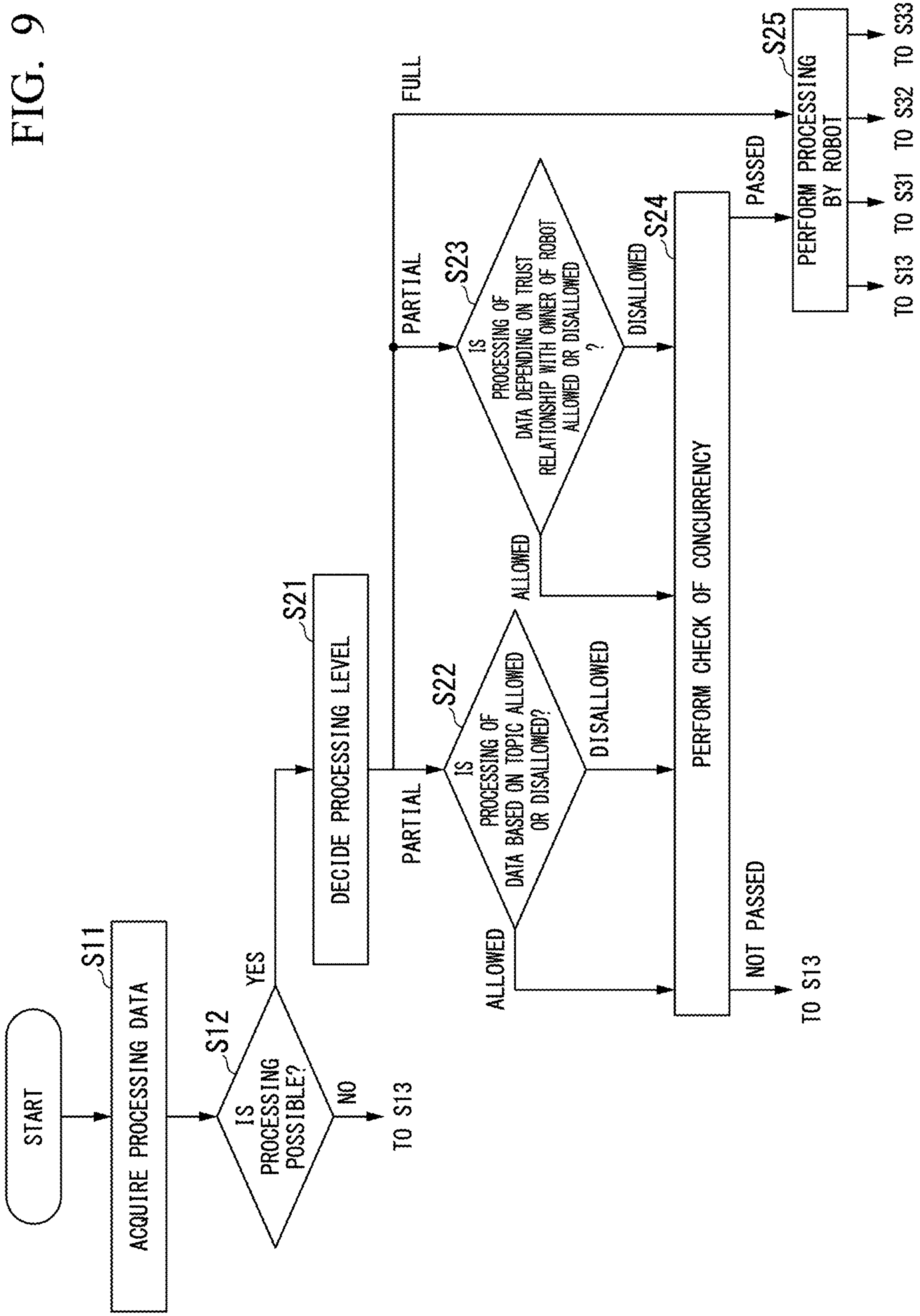
FIG. 9 is a flowchart of a second process in the embodiment.

(Step S12) The policy processing unit 306 checks whether or not the second robot 3 can process (or is allowed to process) the processing data. When the second robot 3 can process the processing data (step S12; YES), the policy processing unit 306 proceeds to the processing of step S21 (FIG. 9). When the second robot 3 cannot process the processing data (step S12; NO), the policy processing unit 306 proceeds to the processing of step S13.

(Step S13) The policy processing unit 306 checks whether or not the processing data is to be sent to the user's first robot 2 for processing. When the policy processing unit 306 should send the processing data to the user's first robot 2 for processing (step S13; YES), the process proceeds to the processing of step S14. When the policy processing unit 306 should not send the processing data to the user's first robot 2 for processing (step S13; NO), the process proceeds to the processing of step S16.

(Step S14) The policy processing unit 306 encrypts the processing data. After processing, the policy processing unit 306 proceeds to the processing of step S15.

(Step S15) The policy processing unit 306 transmits the encrypted processing data to the user's first robot 2 using, for example, the user's device ID. After processing, the policy processing unit 306 ends the process.

(Step S16) The policy processing unit 306 deletes the processing data without storing the processing data. After processing, the policy processing unit 306 ends the process.

(Second Process)

FIG. 9 is a flowchart of a second process in the present embodiment. The second process is a process when the data processing check is successful.

(Step S12) The policy processing unit 306 proceeds to the processing of step S21 when the second robot 3 can process processing data (step S12; YES).

(Step S21) The policy processing unit 306 decides a processing level. Processing levels are, for example, a partial level (PARTIAL) and a full level (FULL). When the processing level is the partial level (PARTIAL), the policy processing unit 306 proceeds to the processing of steps S22 and S23. When the processing level is the full level (FULL), the policy processing unit 306 proceeds to the processing of step S25.

(Step S22) The policy processing unit 306 compares a user's sensitive topics list stored in the storage unit 307 with a topic or keyword to check metadata of the processing data. Subsequently, the policy processing unit 306 determines whether or not to allow data processing on the basis of a check result. When the policy processing unit 306 allows the data processing (step S22; ALLOWED), the process proceeds to the processing of step S24. When the policy processing unit 306 does not allow the data processing (step S22; DISALLOWED (NO)), the process proceeds to the processing of step S24.

(Step S23) The policy processing unit 306 performs comparison with an identified user for the processing in the user's first robot 2 and refers to a unique profile of the user stored in the storage unit 307. Furthermore, the policy processing unit 306 determines whether or not this processing is data processing that depends on a relationship of trust between the owner of the second robot 3 and the user. The policy processing unit 306 determines whether or not to allow data processing according to a determination result. When the data processing is allowed (step S23; ALLOWED), the policy processing unit 306 proceeds to the processing of step S24. When the data processing is not allowed (step S23; DISALLOWED (NO)), the policy processing unit 306 proceeds to the processing of step S24.

(Step S24) The policy processing unit 306 checks concurrency on the basis of trust between the topic and another individual. The policy processing unit 306 determines the concurrency according to the fact that both steps S22 and S23 do not result in failure. When a result of the check is successful (step S24; passed), the policy processing unit 306 proceeds to the processing of step S25. When a result of the check is not successful (step S24; not passed), the policy processing unit 306 proceeds to the processing of step S13 (FIG. 8).

(Step S25) The policy processing unit 306 proceeds to the respective processing steps (steps S13 and S31 (FIG. 10), S32 (FIG. 10), and S33 (FIG. 10)) to process the processing data in the second robot 3.

(Third Process)

Figure 10:
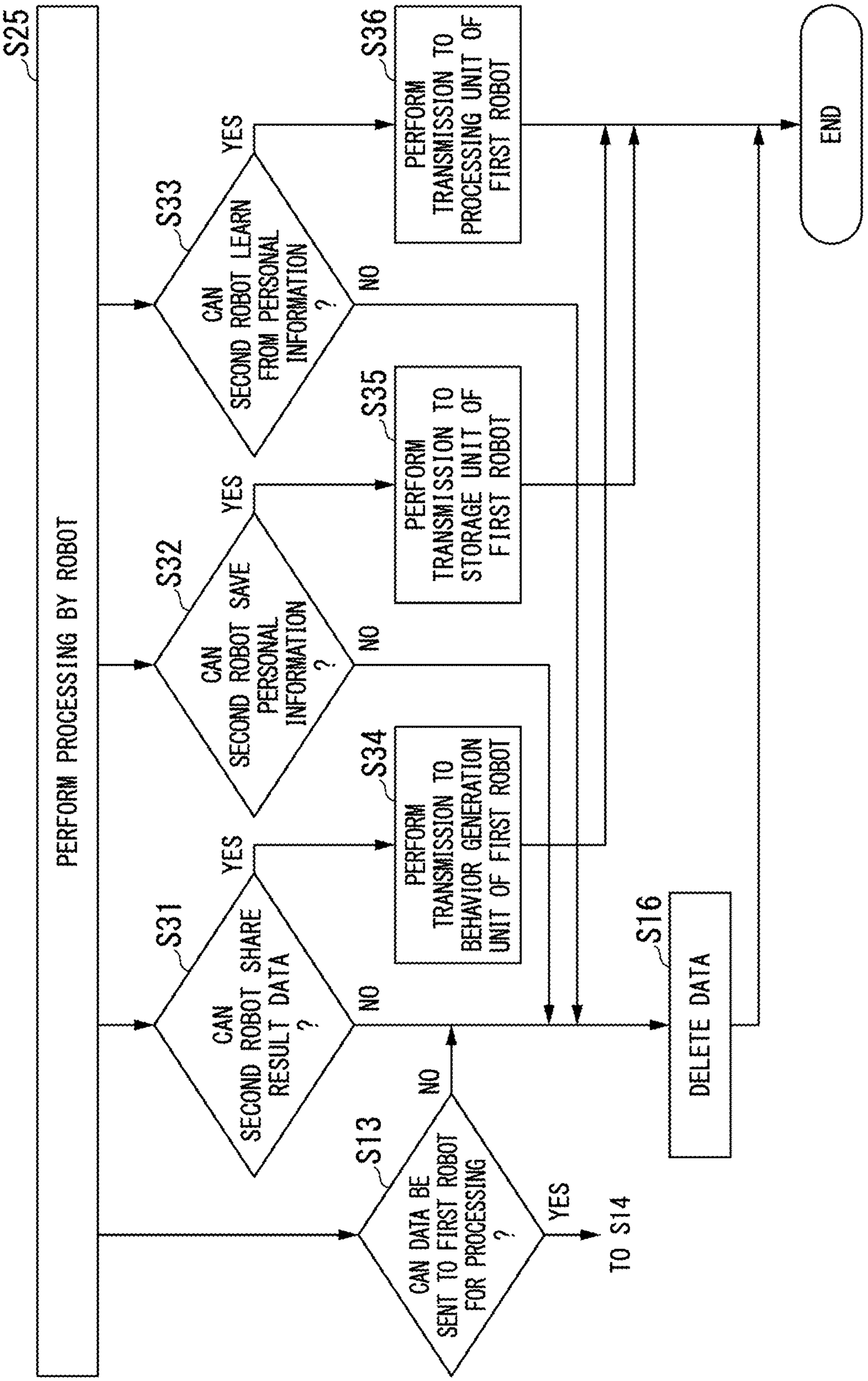
FIG. 10 is a flowchart of a third process in the embodiment.
Figure 11:
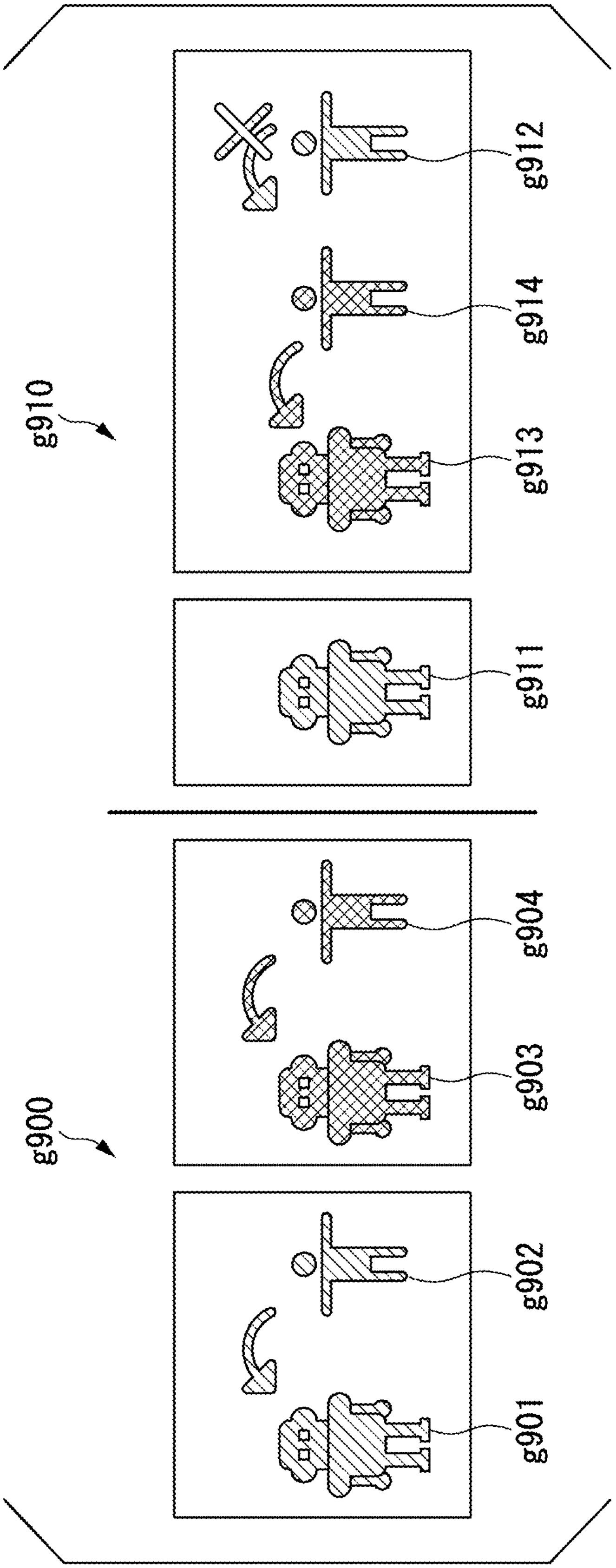
FIG. 11 is a diagram showing an example of an individual having a robot device that processes his or her data in the prior art.

FIG. 10 is a flowchart of a third process in the present embodiment. The third process is a process on the second robot 3.

(Step S25) The policy processing unit 306 proceeds to the respective processing steps (steps S16, S31, S32, and S33) to process the processing data in the second robot 3. The policy processing unit 306 performs the processing of step S13 to determine whether or not the result can be sent to the first robot 2, which is the host device.

(Step S31) In order to provide a notification of the operation of the second robot 3, the policy processing unit 306 checks whether or not a processing result can be shared with the first robot 2. When the processing result can be shared (step S31; YES), the policy processing unit 306 proceeds to the processing of step S34. When the processing result cannot be shared (step S31; NO), the policy processing unit 306 proceeds to the processing of step S16.

(Step S32) The policy processing unit 306 checks whether or not the processing result can be saved in the storage unit 307 of the second robot 3. When the processing result can be saved in the storage unit 307 of the second robot 3 (step S32; YES), the policy processing unit 306 proceeds to the processing of step S35. When the processing result cannot be saved in the storage unit 307 of the second robot 3 (step S32; NO), the policy processing unit 306 proceeds to the processing of step S16.

(Step S33) The policy processing unit 306 checks whether or not the second robot 3 can learn from the data and results anonymously. When the second robot 3 can learn from the data and results anonymously (step S33; YES), the policy processing unit 306 proceeds to the processing of step S36. When the second robot 3 cannot learn from the data and results anonymously (step S33; NO), the policy processing unit 306 proceeds to the processing of step S16. The policy processing unit 306 performs all of the processing of steps S31 to S33.

(Step S16) When check results in steps S31, S32, and S33 are NO, the policy processing unit 306 deletes the results and data. After processing, the policy processing unit 306 ends the process.

(Step S34) The policy processing unit 306 sends data and results to the operation processing unit 205 of the first robot 2 (Host's Device Behavior). After processing, the policy processing unit 306 ends the process.

(Step S35) The policy processing unit 306 sends the data and results to the first robot 2 so that they are stored in the storage unit 207 of the first robot 2 (Host's Device Storage).

(Step S36) The policy processing unit 306 sends data and results to the operation processing unit 205 of the first robot 2 (Host's Device Logic). After processing, the policy processing unit 306 ends the process.

The processing procedure and processing content shown in FIGS. 7 to 10 are examples and the present invention is not limited thereto. For example, some processing steps may be performed at the same time.

In the present embodiment, the robot is configured to identify a procedure for acquiring the user's privacy profile and applying the acquired privacy profile to processing and understanding by itself. When the robot can identify the user in a given place, it means that a privacy profile can be acquired on the basis of user identification information of the user. When the identification has failed, the robot is configured to create a dummy privacy profile for the user. Subsequently, all profiles are loaded to the robot so that they can be understood. Thereby, the robot is ready for data processing.

Appropriate processing is performed on the basis of the trust of this individual's data regarding other individuals present in a given place and the owner of this social robot, as determined from the user's privacy profile. The appropriate processing of this robot is decided according to allowance from the privacy profile for sharing, holding, and learning results.

Thereby, in the present embodiment, the robot is configured to identify an individual present in a given place during the interaction and acquire a privacy profile associated with the identified individual. In the present embodiment, appropriate-level-based processing allowed to be performed can be performed in accordance with the user's personal preferences regarding how the user's data should be handled and processed by other devices.

Although an example in which the user robot is the first robot 2 and the second robot 3 performs the processing related to the policy has been described in the above-described example, the user's robot may be the second robot 3 and the first robot 2 may perform the processing related to the policy.

Although a robot as an example of an information processing device has been described in the above-described example, the present invention is not limited thereto. The information processing device may be one that can be used for communication, for example, a portable terminal, a tablet terminal, a smartphone, a stuffed animal, a mascot, a doll, a figurine, and the like.

Although an example in which each robot performs processing has been described in the above-described example, the processing may be performed on the cloud.

A program for implementing all or some functions of the first robot 2 or the second robot 3 in the present invention is recorded on a computer-readable recording medium, and the program recorded on the recording medium is read into a computer system and executed, such that all or some processing steps of the first robot 2 or the second robot 3 may be performed. The "computer system" used here is assumed to include an operating system (OS) or hardware such as peripheral devices. The "computer system" is also assumed to include a WWW system equipped with a homepage provision environment (or display environment). Also, the "computer-readable recording medium" refers to a flexible disk, a magneto-optical disc, a read-only memory (ROM), a portable medium such as a compact disc-ROM (CD-ROM), or a storage device such as a hard disk embedded in the computer system. Furthermore, the "computer-readable recording medium" is assumed to include a medium that holds a program for a certain period of time, such as a volatile memory (random-access memory (RAM)) inside a computer system serving as a server or a client when the program is transmitted via a network such as the Internet or a communication circuit such as a telephone circuit.

Also, the above-described program may be transmitted from a computer system storing the program in a storage device or the like to another computer system via a transmission medium or by transmission waves in a transmission medium. Here, the "transmission medium" for transmitting the program refers to a medium having a function of transmitting information, as in a network (communication network) such as the Internet or a communication circuit (communication line) such as a telephone circuit. Also, the above-described program may be a program for implementing some of the above-described functions. Further, the above-described program may be a so-called differential file (differential program) capable of implementing the above-described function in combination with a program already recorded on the computer system.

Although modes for carrying out the present invention have been described above using embodiments, the present invention is not limited to the embodiments and various modifications and substitutions can also be made without departing from the scope and spirit of the present invention.

What is claimed is:

1. An information processing device for processing user information about a user, the information processing device comprising:
- a processor; and
- a memory including at least one of a first information area and a second information area where the user information is classified and stored,
- wherein the first information area is a general access permission determination block having a list including a sensitive topic, sensitivity scores assigned to topics including the sensitive topic, and an appropriate data processing level of the user information allowed for the information processing device,
- wherein the second information area is a user-specific access permission block when information is exchanged between the information processing device and an information processing device of an other user different from the user,
- wherein information is exchanged between the information processing device and the information processing device of the other user when the exchange of the information between the information processing device and the information processing device of the other user has been allowed,
- wherein, when information is exchanged between the information processing device and the information processing device of the other user, the processor acquires other user information about the other user, and
- when processing by the information processing device of the user is not allowed on the basis of the second information area for processing of the acquired other user information and when transmission to the information processing device of the other user is allowed, the processor does not perform any processing and sends the other user information to the information processing device of the other user after encrypting the other user information, and
- when processing by the information processing device of the user is not allowed on the basis of the second information area for processing of the acquired other user information and when transmission to the information processing device of the other user is not allowed, the processor does not perform any processing and does not send the other user information to the information processing device of the other user, and
- wherein the processing of the acquired other user information includes at least one of sharing, storing, and learning the acquired other user information by the information processing device of the user.

2. The information processing device according to claim 1, further comprising a third information area for classifying the user information that is registered information of a publicly accessible user and information processing device.

3. The information processing device according to claim 2, wherein an information area is classified as any one of the first information area, the second information area, and the third information area on the basis of a level of trust between the user and the other user who exchanges information with the user.

4. The information processing device according to claim 1, wherein other user information about the other user is acquired and it is determined whether to perform processing of all of the other user information or whether to perform processing of a part of the other user information on the basis of a processing level when processing by the information processing device of the user is allowed on the basis of the second information area for processing of the acquired other user information.

5. An information processing system comprising:

a first information processing device of a first user; and a second information processing device of a second user, wherein the second information processing device includes a processor and a memory including at least one of a first information area and a second information area where user information is classified and stored, the user information of the second user being classified into either one of the first information area and the second information area on the basis of a level of trust between the second user and the first user who exchanges information with the second user, wherein the first information area is a general access permission determination block having a list including a sensitive topic, sensitivity scores assigned to topics including the sensitive topic, and an appropriate data processing level of the user information allowed for the information processing device, wherein the second information area is a user-specific access permission block when information is exchanged between the first information processing device and the second information processing device, wherein information is exchanged between the first information processing device and the second information processing device when the exchange of the information between the first information processing device and the second information processing device has been allowed, and wherein, when information is exchanged between the first information processing device and the second information processing device, the processor acquires first user information about the first user, and when processing by the second information processing device is not allowed on the basis of the second information area for processing of the acquired first user information and when transmission to the first information processing device is allowed, the processor does not perform any processing and sends the first user information to the first information processing device after encrypting the first user information, and when processing by the second information processing device is not allowed on the basis of the second information area for processing of the acquired first user information and when transmission to the first information processing device is not allowed, the processor does not perform any processing and does not send the first user information to the first information processing device, and wherein the processing of the acquired first user information includes at least one of sharing, storing, and learning the acquired first user information by the second information processing device.

6. An information processing method of an information processing device for processing user information about a user, the information processing method comprising:

the information processing device including a processor and a memory, causing the memory to include at least one of a first information area and a second information area where the user information is classified and stored, wherein the first information area is a general access permission determination block having a list including a sensitive topic, sensitivity scores assigned to topics including the sensitive topic, and an appropriate data processing level of the user information allowed for the information processing device, wherein the second information area is a user-specific access permission block when information is exchanged between the information processing device and an information processing device of an other user different from the user, and causing the processor:

when information is exchanged between the information processing device and the information processing device of the other user, to acquire other user information about the other user; and when processing by the information processing device of the user is not allowed on the basis of the second information area for processing of the acquired other user information and when transmission to the information processing device of the other user is allowed, not to perform any processing, and to send the other user information to the information processing device of the other user after encrypting the other user information; and when processing by the information processing device of the user is not allowed on the basis of the second information area for processing of the acquired other user information and when transmission to the information processing device of the other user is not allowed, not to perform any processing, and not to send the other user information to the information processing device of the other user, and wherein the processing of the acquired other user information includes at least one of sharing, storing, and learning the acquired other user information by the information processing device of the user.

* * * * *